Patented Apr. 14, 1953

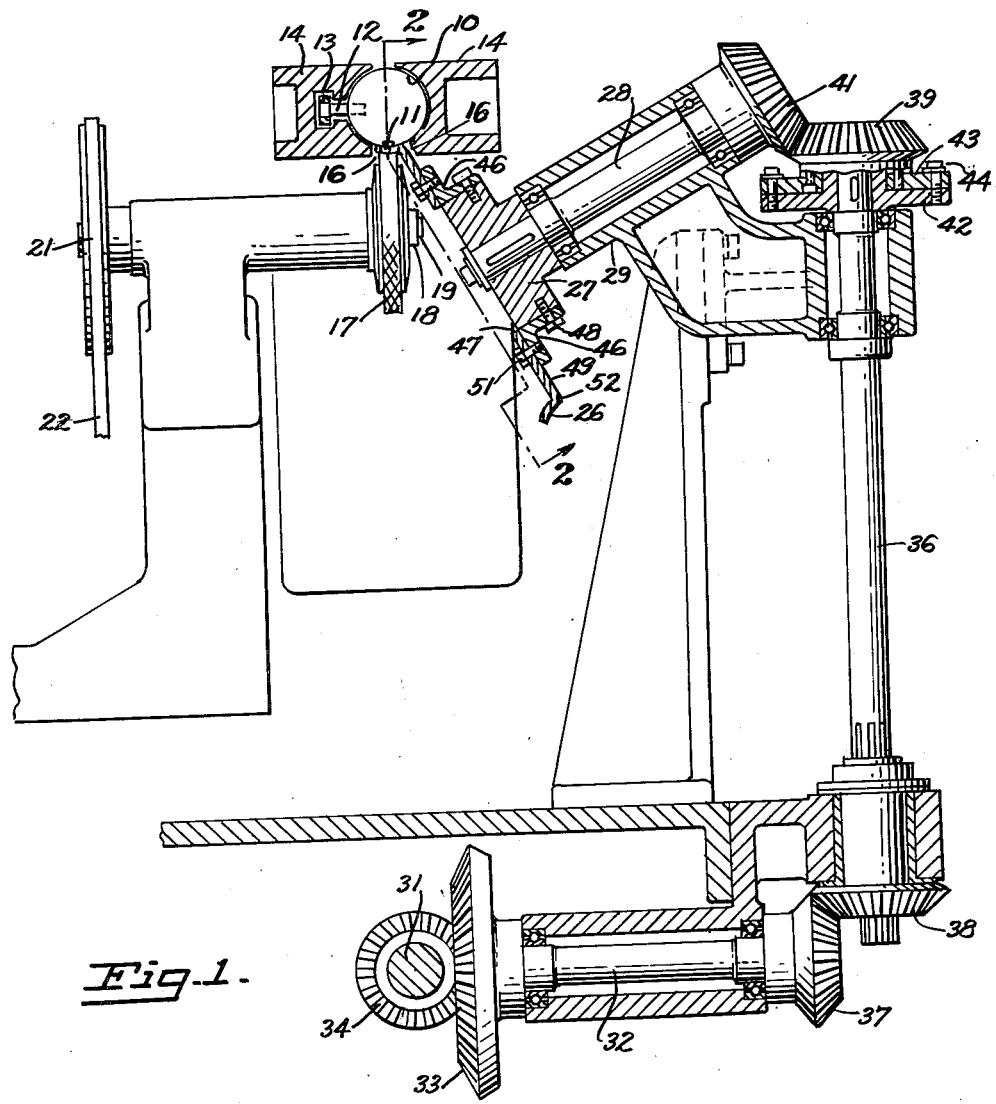

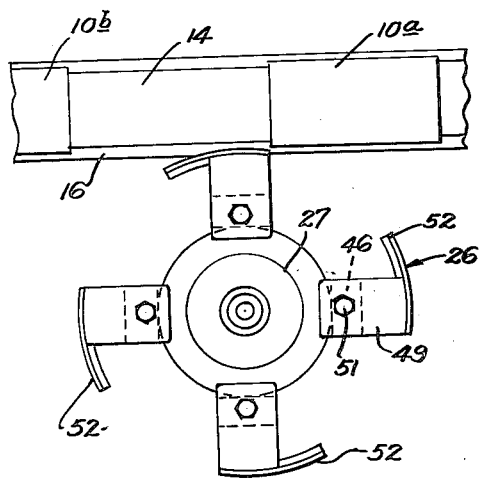
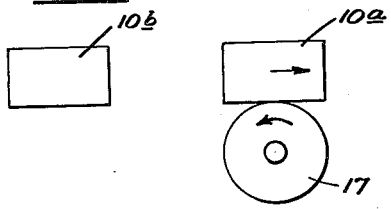
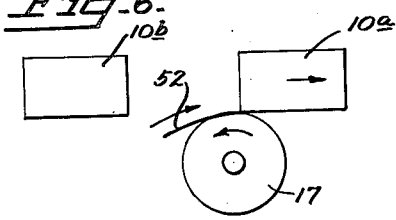
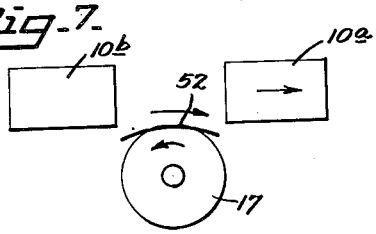
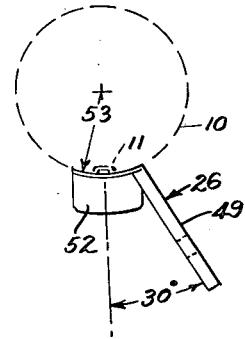
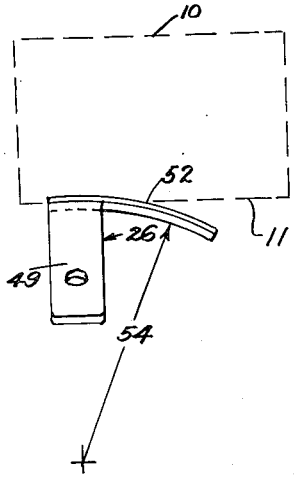
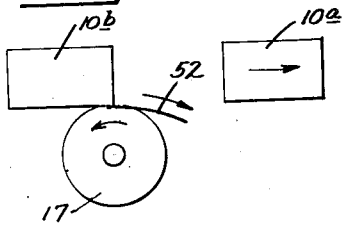

2,634,695

UNITED STATES PATENT OFFICE 2,634,695

CAN WIPING AND SHIELDING MECHANISM

Robert J. Bogle, San Francisco, and Roland E. Renard, Los Gatos, Calif., assignors to Pacific Can Company, San Francisco, Calif., a corporation of Nevada Application June 18, 1951, Serial No. 232,194

3 Claims. (Cl. 113—97)

This invention relates to new and useful improvements in can wiping and shielding mechanism and has particular reference to can wiping and shielding mechanism to prevent excess solder wiped from the side seams of can bodies from being thrown into the interiors of cans.

During the formation of can bodies, after the side seams have been formed, solder is applied to the exterior of the side seam, and the excess solder is wiped by means of a rotating wiper wheel which contacts the side seam as the cans pass over the periphery of the wheel. Such wipers are ordinarily made of a plurality of superposed discs of fabric, of brushes, or of various other materials.

One of the problems encountered in the use of such rotary wipers is the fact that solder tends to be thrown inside the can following the particular can being wiped by reason of the fact that solder on the wiper flies off the wheel tangentially and may fall inside the open-ended can following that being wiped. The present invention comprises a means for shielding the following can and intercepting the solder.

In accordance with the invention, one or more shields are mounted on a rotating wheel which revolves in timed relation to movement of the cans as they are conveyed over the wiper wheel. Said shields are arranged to move over the top of the wiper during the interval between two cans and to intercept solder thrown from said wiper and prevent said solder from reaching the interior of the approaching can. Each said shield viewed in side elevation, transverse to the direction of movement of the cans, is arcuate, the radius of curvature of said shield as so viewed being such that the shield is tangent to the path of the cans in the zone immediately above the wiper but the shields are always below the path along which the cans pass. Thus, in the event of mis-timing it is impossible for the cans to strike against the shields, thus eliminating the danger of damage to the shields or to the cans.

The arcuate length of the shield as viewed in side elevation is slightly greater than the distance between the trailing edge of one can and the leading edge of the next, as said cans move along the conveyor. The shield therefore bridges the gap between cans and protects the interior of the approaching can.

Viewed in end elevation, the shield is arcuate, having a radius of curvature slightly larger than that of the cans being wiped. Further, the chordal width of said last-mentioned arc is only slightly less than the gap at the bottom of the guideways along which the cans move, thus eliminating the possibility that solder may be thrown past the sides of the shield. It will be seen that the instant shield in effect shields both the interior and the exterior of the approaching can body from surplus solder thrown from the wiper.

The shield is made very thin, and, as has been stated, is mounted so that it never rises into the path of the cans. Hence in passing over the wiper, the wiper is compressed slightly by the thickness of the shield, this resulting in wiping of excess solder off the shield and also off the wiper. Because the shield is thin, the wiper is not permanently deformed or excessively worn by compression.

Another feature of the invention is the fact that the wheel on which the shield or shields are mounted is disposed with its axis of rotation inclined at an angle of about 30° to the horizontal and is disposed transverse to the direction of movement of the cans. This disposition permits the use of a wheel of smaller diameter than if the discs were vertically disposed, and thereby permits the use of fewer shields spaced about the periphery of the wheel for the same peripheral speed, it being understood that the peripheral speed of the wheel on which the shields are mounted should be equal to the linear speed of the cans. The oblique arrangement of the rotating wheel further permits positioning the wheel and its driving mechanism on the soldering machine higher above the floor and prevents interference with other mechanism on the soldering machine which is ordinarily disposed below the level of the wiper.

Further objects and advantages of the instant invention will become apparent upon reading the following specification, reference being had to the accompanying drawings, in which:

Fig. 1 is a vertical section through the machine at the point of tangency between wiper and cans;

Fig. 2 is a section taken substantially along the line 2—2 of Fig. 1;

Fig. 3 is an end elevation of a shield;

Fig. 4 is a side elevation thereof;

Fig. 5 is a schematic view showing the wiper wiping the leading can body at about the middle of the side seam;

Fig. 6 is a schematic view showing the action of the wiper at the end of the can body and the shielding effect of the shield as it moves into the gap between cans;

Fig. 7 is a similar view showing the effect of the shield when the leading and approaching cans are about equidistant from the wiper;

Fig. 8 is a similar view showing the position of the shield at the beginning of the wiping of the approaching can.

As illustrated in the accompanying drawings, cams 10 which have been formed in a bodymaker (not shown) with a side seam 11 disposed downwardly and soldered by the application of a surplus of solder on said side seam, are moved along by means of lugs 12 on conveyor chain 13 between horizontally disposed, opposed, arcuate guideways 14. Successive cans are spaced apart a predetermined, uniform distance. The bottom portions 16 of guideways 14 are cut away, exposing the bottom portions of cans 10, including the side seams 11 thereof. As cans 10 are moved along guideways 14, the side seams 11 are wiped by contact with revolving wiper 17, the seam 11 being advanced approximately tangent to the periphery of wiper 17. Wiper 17 may be constructed in various ways and of various materials, one preferred construction comprising a plurality of disc-like layers of fabric fixed to hub 18, which is connected through horizontal shaft 19 to pulley 21 and driven by belt 22 from a suitable electric motor (not shown). The material of which wiper 17 is made is preferably such that it may be compressed radially without permanently losing its shape or wearing excessively.

Wiper 17 rotates in a vertical plane at a rapid rate about its axis transverse to the direction of movement of cans 10 so that the periphery passing under and contacting side seam 11 tends to drive surplus solder rearwardly of the can. It will be understood that the solder adhering about seam 11 is not yet set, and hence the action of wiper 17 distributes the solder evenly about and within the crevice of the seam and removes the excess. Some of the solder may be carried around by wiper 17 to a scraper (not shown) which removes most of the solder adhering to the wiper, but solder splash and pellets tend through centrifugal force to be thown off wiper 17 tangentially. The primary purpose of the instant invention is to prevent solder thrown off from entering the can approaching the wiper.

The interception of solder is accomplished by one or more shields 26, the configuration of which is hereinafter described, each mounted upon the periphery of rotatable wheel 27. Said wheel 27 is keyed for rotation with shaft 28, the axis of which is inclined approximately 30° to the horizontal and is disposed transverse to the direction of movement of the cans. Shaft 28 and its mounting and driving mechanism are disposed to one side of the machine and the corresponding opening 16 in guideway 14 is enlarged to provide clearance for the wheel and shields. The axes of wheel shaft 28 and wiper 17 lie in a common vertical plane transverse to the direction of movement of cans, all as best shown in Fig. 1. Shaft 28 is suitably supported in bracket 29 attached to the main part of the machine and is driven in timed relation with respect to main drive shaft 31, which, in turn, revolves in timed relation to movement of conveyor 13. One means of driving shaft 28 is illustrated in the accompanying Fig. 1, comprising a horizontal shaft 32 keyed to bevel gear 33 which meshes with bevel gear 34 on drive shaft 31. Horizontal shaft 32 drives vertical shaft 36 through meshing miter bevel gears 37 and 38, and vertical shaft 36 drives shaft 28 through bevel gears 39 and 41. To facilitate adjustment of timing, vertical shaft 36 is not directly connected to gear 41, but is in turn keyed to disc 42, whereas gear 39 is keyed to superposed disc 43. Discs 42 and 43 are adjustably bolted together by bolts 44 which pass through arcuate slots in disc 43 and are threaded into disc 42. By slipping discs 42 and 43 relative to each other before bolts 44 are drawn tight, the timing may be adjusted. It will be understood that suitable bearings and anti-friction bushings are employed to support and journal shafts 28, 32, and 36.

The timing of the rotation of shaft 28 and the radial distance of shields 26 from said shaft are such that shields 26 advance beneath cans 10 with a peripheral speed equal to the linear speed of the cans. The circumferential distance between shields 26 is equal to the distance between cans 10. In the accompanying drawings there are four shields 26 equally spaced about the periphery of wheel 27, and shaft 28 rotates one-quarter revolution per can.

Shields 26 are mounted on wheel 27 by means of angles 46 which are held in grooves 47 extending parallel to the axis of wheel 27 and recessed into the periphery thereof, said angles being held by machine bolts 48.

Shields 26 are of a particular configuration, each said shield having a radially extending stem 49 (which is held fixed to angle 46 by bolts 51) and a compound arcuate member 52. Said arcuate member 52 has a radius of curvature 53 in transverse cross-section, shown particularly in Fig. 3, which is slightly larger than the radius of cans 10. Thus arcuate member 52 fits closely under side seam 11 and tangent thereto. Viewed in side elevation, as best shown in Fig. 4, said arcuate member 52 has a radius of curvature 54 such that said shield is tangent to the path of the advancing cans but never rises into the imaginary horizontal round cylinder which represents the path of the advancing cans. Thus in the event of mis-timing, cans 10 cannot strike shields 26 and thus neither can be damaged. It will further be noted that the trailing end of member 52 fits under the front edge of the approaching can 10b and thereby prevents said front edge from digging into the wiper 17 (Fig. 8). The digging action of the following can is one of the primary causes of solder splash in conventional soldering machines.

Shield members 52 are exceptionally thin, being about 1/16 inch in thickness. Thus, as seen especially in Fig. 2, said member 52 compresses wiper 17 when positioned thereabove by the amount of its thickness. The underside of shield member 52 conforms to the shape of the periphery of wiper 17, which generally has the same arcuate shape and radius of curvature as the cans. The action of wiper 17 on shield 26 clears the shield from accumulation of solder. Simultaneously shield 26 serves in part to scrape solder off wiper 17 and thus acts as an auxiliary scraper to the usual wiper scraper.

In operation, it will be understood that as leading can 10a passes along guideway 14 and over wiper 17, the excess solder is wiped off (Fig. 5). As the trailing end of leading can 10a passes over wiper 17, shield member 52 comes up behind the can and is interposed between wiper 17 and following can 10b (Fig. 6), but member 52 never crosses the path of the advancing cans and hence there can be no interference in the event of mis-timing. While no can is over wiper 17, shield 52 continues to block off the entrance of solder splash into the open end of approaching can 10b (Fig. 7). As can 10b approaches wiper 17, the trailing end of shield member 52 fits under the extreme forward end of can 10b and protects said forward end and prevents it from digging into wiper 17 at the initial contact therewith (Fig. 8). The accurate timing of the advance of conveyor 13 and rotation of wheel 27 and the fact that the circumference of a circle passing around member 52 equals the distance between cans multiplied by the number of shields, enables members 52 to come into proper position.

Although a specific embodiment of the invention has been described, it will be understood that changes may be made therein without departing from the scope of the appended claims.

What is claimed is:

1. In combination, guideways confining the path of movement of open-ended cans in a straight line, a conveyor for moving said cans in a direction parallel to their axes in uniformly spaced relation, a radially resiliently compressible rotary wiper positioned to remove surplus solder from said cans while moving along said guideways, at least one thin shield, and a shaft for rotating said shield about an axis in timed relation to movement of said conveyor, the axis of said shaft being disposed transverse to the can path and lying in a vertical plane containing the wiper axis, said axis of said shaft being disposed at an angle with respect to the horizontal, said shield in side elevation being arcuate and downwardly concave and in end elevation arcuate and upwardly concave and positioned and arranged so that said shield upon rotation is tangent to the lower portion of the path of advancing cans and in all positions is below the path of advancing cans, the arcuate length of said shield being approximately equal to the linear gap between cans.

2. The combination defined in claim 1 in which the radius of curvature of the upwardly concave surface of said shield in end elevation is approximately equal that of the cans being wiped and said shield is arranged upon rotation to fit under the side seam and surrounding portion of said cans.

3. In combination, guideways confining the path of movement of open-ended cans in a straight line, a conveyor for moving said cans in a direction parallel to their axes in uniformly spaced relation, a radially resiliently compressible rotary wiper positioned to remove surplus solder from said cans while moving along said guideways, at least one thin shield, and means for rotating said shield about an axis in timed relation to movement of said conveyor, said shield in side elevation being arcuate and downwardly concave and positioned and arranged so that said shield upon rotation is tangent to the lower portion of the path of advancing cans, said axis of rotation being inclined downwardly from the horizontal and transverse to the direction of movement of said cans, said axis and the axis of rotation of said wiper lying in a common vertical plane, said shield in end elevation being arcuate upwardly concave and having a radius of curvature approximately equal to that of the cans being wiped, said shield in all positions being below the path of advancing cans and having an arcuate length in side elevation approximately equal to the linear gap between cans.

ROBERT J. BOGLE.
ROLAND E. RENARD.

References Cited in the file of this patent

UNITED STATES PATENTS

| Number | Name | Date |
|---|---|---|
| 1,985,906 | Smith | Jan. 1, 1935 |
| 2,161,839 | Woolford | June 13, 1939 |
| 2,266,792 | O'Neil | Dec. 23, 1941 |